3,574,728
PROCESS FOR PRODUCING SORBIC ACID
Itaru Takasu, Masaru Higuchi, and Yoshito Hijioka, Saitama, Japan, assignors to Daicel Ltd., Osaka, Japan
No Drawing. Filed Nov. 17, 1967, Ser. No. 683,786
Int. Cl. C07c 7/10
U.S. Cl. 260—526                                  8 Claims

ABSTRACT OF THE DISCLOSURE

A process for producing crotonaldehyde ketone addition compounds adapted for the production of sorbic acids and its salts which comprises reacting ketene with crotonaldehyde in the presence of a bivalent metal complex of acetylacetone in which the metal is a member selected from the group consisting of zinc, cadmium and manganese, said complex having no other group which inhibits the reaction of ketene and crotonaldehyde.

---

This invention relates to a process for producing crotonaldehyde ketone addition compounds which essentially consist of polyesters, possibly formed by ring opening of 3-hydroxy-4-hexenoic acid-(1)-lactone, which are formed by a reaction between ketene and crotonaldehyde and which are valuable intermediates for the production of sorbic acid and its salts.

More particularly, the present invention concerns a novel process for making such products adapted to the production of sorbic acid and its salts wherein a bivalent metal complex of acetylacetone, in which the metal is a member selected from the group consisting of zinc, cadmium and manganese, is used as a catalyst.

As is well known, the crotonaldehyde ketene addition compound is an intermediate of technical importance for the production of sorbic acid and its salts, its esters, piperylene, or other derivatives. For the catalyst to be employed in the addition reaction of crotonaldehyde and ketene, numerous proposals have been made. It has already been suggested to use Lewis acids such as boron fluoride, zinc chloride, and aluminum chloride (see Organic Reactions, vol. 8, p. 340); nickel, zinc and cobalt salts of a fatty acid of 4 to 18 carbon atoms (see U.S. patent application No. 252,194); fatty acid salts of a bivalent transition metal (see Japanese patent publication No. 7,212/1962); a zinc salt of an organic acid containing not more than three carbon atoms (see French Pat. No. 1,309,051); zinc sorbate (see British Pat. No. 885,217); etc. However, some of these catalysts have given such low yields that they are not practical at all and others have been found as a result of experiments to be low in the rate of absorption of ketene into the liquid containing crotonaldehyde or to give unsatisfactory yields in the case of obtaining sorbic acid from the produced crotonaldehyde ketene addition compound.

Quite differing from these methods, the present invention comprises reacting ketene with crotonaldehyde in the presence of a bivalent metal complex of acetylacetone in which the metal is a member selected from the group consisting of zinc, cadmium and manganese, said complex having no other group which inhibits the reaction of ketene and crotonaldehyde.

It is the object of this invention to provide a method of obtaining high yields of crotonaldehyde ketene addition compounds of high quality suitable for industrial use.

The bivalent metal complex used in the present invention is a chelate compound containing one or more acetylacetonato-groups per metal-atom as a ligand. Particularly, complexes adapted for the purposes of this invention are anhydrous zinc acetylacetonate, hydrated zinc acetylacetonate, cadmium acetylacetonate and manganese (II) acetylacetonate. They are obtained by such known processes as the reaction of acetylacetone with the crbonate, sulfate or hydroxide of any of said metals and the reaction of the sodium salt of acetylacetone with the chloride of any of said metals. Zinc acetylacetonate is not so sensitive to the water in the reaction system as conventional catalysts, whereas often in the reactions using the conventional catalysts the presence of even a small amount of water affects the structure of product so as to give a polyester of lower average molecular weight having inferior quality. Therefore, the monohydrate of zinc acetylacetonate usually available as such, can be employed as well as the anhydrous one. It will be of great economic advantage in the case of large scale production that the monohydrate can be used as it is. Furthermore, the complex denoted by the formula $(CH_3COO)(acac)_3Zn_2$, wherein acac is an acetylacetonato-group, which contains a group not inhibiting the reaction, other than water, is also adapted to the purpose of this invention. This complex is obtained by a known method such as is mentioned, for example, in Inorganic Chemistry, vol. 3, pp. 1317–1318 (1963).

The catalyst is added in an amount required to maintain the activity of the catalyst in response to the reaction temperature and the degree of dilution. However, the amount of catalyst usually is selected to be in the range from about 0.01 percent to about five percent, preferably from about 0.1 percent to about two percent by weight of the crotonaldehyde ketene addition compound to be obtained.

In the reaction, crotonaldehyde in liquid or solution containing a proper quantity of the catalyst as defined in this invention and ketene in gaseous form are brought into intimate contact with each other batchwise or continuously. For industrial practice it is preferable that the reactants bypassed cocurrently or countercurrently in the continuous manner through one or more scrubber-type reactors in which the most intimate gas-liquid contact is obtained.

Ketene can be used under atmospheric pressure as well as subatmospheric or superatmospheric pressure depending upon circumstances. The reaction may be carried out in such a way that approximately equimolar amounts of ketene and crotonaldehyde are simultaneously introduced into the system when the catalyst is dissolved or partly dispersed in an inert solvent. Alternatively, a lesser proportion of ketene can be introduced into the system when the catalyst is dissolved or partly dispersed in crotonaldehyde itself as a solvent.

As the inert solvents which will not inhibit the reaction, there may be mentioned the dialkyl ethers, e.g. diethyl ether, diisopropyl ether, dioxane, etc., the lower alkyl ketones, e.g. acetone, methyl ethyl ketone, etc., the esters, e.g. ethyl acetate, etc., the aliphatic, alicyclic or aromatic hydrocarbons, e.g. hexane, cyclohexane, benzene, toluene, a petroleum fraction boiling at a temperature of 180° C. to 300° C., etc., and the chlorinated hydrocarbons, e.g. chloroform, carbon tetrachloride, ethylene dichloride, etc.

Although in these solvents it is desired to cause ketene and crotonaldehyde to react as equimolecularly as possible, a little excess of either component will be allowable if the removal of unreacted raw material or byproducts is carried out without any trouble. The reaction temperature should be determined by taking the boiling point of the solvent into consideration, but a temperature above 0° C., particularly within the range between 0° C. and 60° C., where the reaction takes place in liquid phase, is preferable. According to the process of the present invention, a ready ketene absorption and an exothermic reaction are generally brought about. When the reaction is completed, the neutralization of the catalyst with an inorganic or organic base is not essential. By subjecting the reaction product to evaporation, preferably under reduced pressure, the crotonaldehyde ketene addition compound consisting of a polyester may be separated from the solvent, the unreacted reactant species, and the byproducts of lower boiling point, such as a homopolycondensate of each reactant. The crotonaldehyde ketene addition compound removed of the evaporator can be used as such for most industrial uses. However, additional refining steps, other than evaporation, such as solvent washing or extraction, may be carried out.

The thus obtained crotonaldehyde ketene addition compound, which is believed to be substantially a polyester, possibly formed by ring opening of 3-hydroxy-4-hexenoic acid-(1)-lactone, is then converted to sorbic acid and other derivatives by known methods. For instance, hydrolysis with an adequate mineral acid or base and pyrolysis with an adequate acid or basic catalyst are acceptable means to make sorbic acid or its salts in a high yield.

A comparison of the experimental results of the catalysts of this invention compared with those of the conventional catalysts are given in the following table:

duced pressure, there were obtained 167 parts of a polyester containing some impurities. The apparent yield of the crotonaldehyde ketene addition compound was 97.6% of the theoretical based on the ketene reacted. When 50 parts of the polyester were treated in a similar manner to Example 1, pure sorbic acid was obtained in a yield of 43.8 parts.

EXAMPLE 3

1.34 parts of anhydrous zinc acetylacetonate were dissolved into 169.1 parts of crotonaldehyde. 54.9 parts of gaseous ketene under a pressure somewhat higher than atmospheric pressure were gradually introduced into the solution with stirring. Meanwhile, the temperature was kept at $30 \pm 2°$ C. The ketene absorption amounted to 51.5 parts. When excess cortonaldehyde was removed by evaporation under reduced pressure, 127.3 parts of a polyester containing some impurities were obtained. The apparent yield of the crotonaldehyde ketene addition compound was 92.6% of the theoretical based on the ketene consumed.

TABLE

[A comparison of the experimental results of synthesizing crotonaldehyde ketene addition compounds by using the catalysts of this invention compared with those using the conventional catalysts (percentages are given by weight)]

| | Kinds of catalysts | | | | | | | | |
|---|---|---|---|---|---|---|---|---|---|
| | Zinc acetylacetonate monohydrate | Anhydrous zinc acetylacetonate | $(CH_3COO)(acac)_3Zn_2$ | Cadmium acetylacetonate | Manganese (II) acetylacetonate | Cobalt stearate | Zinc isobutyrate | Zinc acetate | Zinc sorbate |
| | Source | | | | | | | | |
| | Present invention | | | | | Catalyst of— | | | |
| Compared items | (Ex. 1) | (Ex. 2) | (Ex. 3) | (Ex. 5) | (Ex. 6) | U.S.P. 3,022,342 | U.S.P. 3,022,342 | F.P. 1,309,051 | B.P. 885,217 |
| Amount of the catalyst based on charged crotonaldehyde, percent | 0.80 | 0.79 | 0.80 | 0.80 | 0.80 | 0.80 | 0.80 | 0.80 | 0.80 |
| Percentage of ketene absorbed | 91.6 | 93.8 | 95.9 | 89.2 | 91.8 | 63.5 | 97.6 | 94.6 | 94.1 |
| Apparent yield of the crotonaldehyde ketene addition compound, percent | 101.6 | 92.6 | 89.5 | 91.5 | 95.1 | 27.8 | 89.6 | 89.1 | 88.5 |
| Color of the addition compound | (¹) | (¹) | (²) | (²) | (²) | (³) | (¹) | (²) | (²) |
| Yield of sorbic acid by the hydrolysis of the addition compound, percent | 85.0 | 87.5 | 85.0 | 87.6 | 86.8 | | 76.9 | 78.4 | 69.1 |

¹ Transparent yellow.  ² Brown.  ³ Dark reddish brown.

From the above table, it will be evident that the catalysts of the present invention give crotonaldehyde ketene addition compounds of high quality in high yield.

The following examples, in which the expressions of parts and percentages are both given by weight, will serve to illustrate the present invention, but they are not intended to limit it thereto.

EXAMPLE 1

2.24 parts of zinc acetylacetonate monohydrate were dissolved into 280 parts of crotonaldehyde. 86 parts of gaseous ketene were gradually introduced into the solution with stirring. Meanwhile, the temperature was kept at about 30° C. The absorption of ketene amounted to 78.8 parts. After the unreacted crotonaldehyde was removed under reduced pressure, there remained 214 parts of a clear yellow viscous liquid consisting of a so-called "polyester" and a small amount of impurities. The apparent yield of the crotonaldehyde ketene addition compound was 101.6% of the theoretical based on the ketene consumed. When 50 parts of the polyester were perfectly hydrolyzed with hydrochloric acid and were refined by a conventional procedure, 42.5 parts of sorbic acid melting at 134° C. were obtained. The yield of sorbic acid was 85.0% of the theroetical based on the polyester.

EXAMPLE 2

1.5 parts of zinc acetylacetonate monohydrate were dissolved into a mixture of 143.9 parts of toluene and 191.8 parts of crotonaldehyde. 73.8 parts of gaseous ketene were gradually introduced into the solution with stirring. Meanwhile, the temperature was kept at $50 \pm 2°$ C. The ketene absorption amounted to 64.2 parts. After the excess crotonaldehyde and toluene were removed under reduced pressure, there were obtained 226 parts of a polyester containing some impurities. The apparent yield of the crotonaldehyde ketene addition compound was 91.5% of the theoretical based on the ketene reacted. When 100 parts of When 50 parts of the polyester were treated in a similar manner to Example 1, 43.8 parts of sorbic acid were obtained in a pure state.

EXAMPLE 4

2.24 parts of $(CH_3COO)(acac)_3Zn_2$ (containing small amounts of zinc acetate and zinc acetylacetonate according to X-ray analysis) prepared by the process mentioned in Inorganic Chemistry, vol. 3, pp. 1317–1318 (1963) were partly dispersed into 281.5 parts of crotonaldehyde. 67.3 parts of gaseous ketene were gradually introduced into the dispersed system with stirring. Meanwhile, the temperature was kept at $30 \pm 2°$ C. The ketene absorption amounted to 64.5 parts. When excess crotonaldehyde was removed by evaporation under reduced pressure, 153.8 parts of a polyester containing some impurities were obtained. The apparent yield of the crotonaldehyde ketene addition compound was 89.5% of the theoretical based on the ketene reacted. When this polyester was treated in a similar manner to Example 1, pure sorbic acid was obtained in a 85.0% yield based on the polyester.

EXAMPLE 5

2.24 parts of cadmium acetylacetonate were dissolved into 280 parts of crotonaldehyde. 104.3 parts of gaseous ketene were introduced into the solution with stirring. Meanwhile, the temperature was kept at $30 \pm 2°$ C. The ketene absorption amounted to 93.0 parts. After the excess crotonaldehyde was removed under reduced pressure, there were obtained 226 parts of a polyester containing some impurities. The apparent yield of the crotonaldehyde ketene addition compound was 91.5% of the theoretical based on the ketene reacted. When 100 parts of the polyester were treated in a similar manner to Example 1, pure soribic acid was obtained in a yield of 87.6 parts.

EXAMPLE 6

2.24 parts of manganese (II) acetylacetonate were added and dispersed into 280.2 parts of crotonaldehyde. 90.4 parts of gaseous ketene were gradually introduced into the dispersed system with stirring. During the reaction the temperature was kept at 30±2° C. The ketene absorption amounted to 83.0 parts. After the excess crotonaldehyde was removed under reduced pressure, there were obtained 210.5 parts of a polyester containing some impurities. The apparent yield of the crotonaldehyde ketene addition compound was 95.1% of the theoretical based on the ketene consumed. When this polyester was treated in a similar manner to Example 1, pure sorbic acid was obtained in a 86.8% yield of the theoretical based on the polyester.

EXAMPLE 7

2.3 parts of zinc acetylacetonate monohydrate were dispersed into a mixture of 194.5 parts of crotonaldehyde and 137.7 parts of a petroleum fraction boiling at a range from 240° C. to 260° C. 175 parts of ketene were gradually introduced into the dispersed system with stirring. During the reaction the temperature was kept at 55±2° C. The ketene absorption amounted to 62.5 parts. When the system was left to stand after the reaction completed, it separated into two layers, in which the upper layer mostly consisted of the petroleum and the lower one the polyester. 500 parts of the same petroleum fraction and 4.5 parts of potassium sorbate were added to the entire reaction mixture and the system was heated under reduced pressure up to 86 mm. Hg. After the lower boiling fraction mostly consisting of the unreacted crotonaldehyde was trapped at a temperature of Dry Ice-methanol mixture, the polyester was decomposed to sorbic acid at 162–183° C. and was submitted to simultaneous distillation. The sorbic acid entrained with the petroleum was separated by filtering the distillate and amounted to 107 parts, while 10 parts of the isomeric mixture of sorbic acid was contained in the filtrate. A treatment with active charcoal and a recrystallization of the thus obtained crude product in water-methanol solution afforded white crystals of the pure sorbic acid melting at 134° C.

EXAMPLE 8

As a base reaction mixture composed of 50.2% polyester, 49.2% crotonaldehyde, and 0.6% zinc acetylacetonate monohydrate was circulated downward at a rate of 78 parts per hour through a column reactor (50 mm. in diameter and 1500 mm. long) charged with Raschig rings, there were fed a solution prepared by dissolving one part of zinc acetylacetonate monohydrate into 80 parts of crotonaldehyde from top of the column at a rate of 0.51 part per hour and ketene prepared by pyrolyzing acetic acid under reduced pressure from bottom of the column at a rate of 0.31 part per hour. The entire reaction system was cooled so that the temperature might not exceed 50° C. Thus, the reaction mixture of a specific gravity of 0.977 was taken out of the storage tank for the circulating solution. After the excess crotonaldehyde was evaporated from the reaction mixture under reduced pressure, there was obtained a polyester containing a small amount of impurities. When the polyester was treated by a similar procedure to Example 1, sorbic acid of high purity was easily obtained.

The embodiments of the invention in which an exclusive property or privilege is claimed are defined as follows:

1. A process for producing crotonaldehyde ketene addition compounds adapted to the production of sorbic acid and its salts which comprises reacting gaseous ketene with liquid crotonaldehyde or a solution thereof in the presence of a bivalent metal complex selected from the group consisting of anhydrous zinc acetylacetonate, monohydrated zinc acetylacetonate, cadmium acetylacetonate, manganese (II) acetylacetonate, and a compound denoted by the formula $(CH_3COO)(acac)_3Zn_2$ in which acac is an acetylacetonato-group, said complex having no other group inhibiting the reaction of ketene and crotonaldehyde.

2. The process according to claim 1, wherein the reaction of ketene and crotonaldehyde is carried out at a temperature above 0° C.

3. The process according to claim 1, wherein crotonaldehyde is used as solvent.

4. The process according to claim 1, wherein an inert solvent which will not inhibit the reaction of ketene and crotonaldehyde is used.

5. The process according to claim 4, wherein said solvent is a member selected from the group consisting of diethyl ether, diisopropyl ether, dioxane, acetone, methylethylketone, ethyl acetate, hexane, cyclohexane, benzene, toluene, a petroleum fraction boiling at a temperature in the range of 180° C. to 300° C., chloroform, carbon tetrachloride and ethylene dichloride.

6. The process according to claim 1, wherein said catalyst is used as dissolved or partly dispersed into the solvent.

7. The process according to claim 1, wherein the amount of the catalyst used is within the range of from about 0.01% to about 5% by weight of the crotonaldehyde ketene addition compound to be obtained.

8. The process according to claim 1, wherein the amount of the catalyst used is within the range of from about 0.1% to about 2% by weight of the crotonaldehyde ketene addition compound to be obtained.

References Cited

UNITED STATES PATENTS 3,022,342    2/1962    Fernholz et al. _____ 260—526

JAMES A. PATTEN, Primary Examiner

U.S. Cl. X.R.

260—343.9